Aug. 10, 1954 A. J. GIFFORD 2,685,898
QUICK-ACTING PRECISION CLAMPING DEVICE
Filed July 12, 1950 2 Sheets-Sheet 1
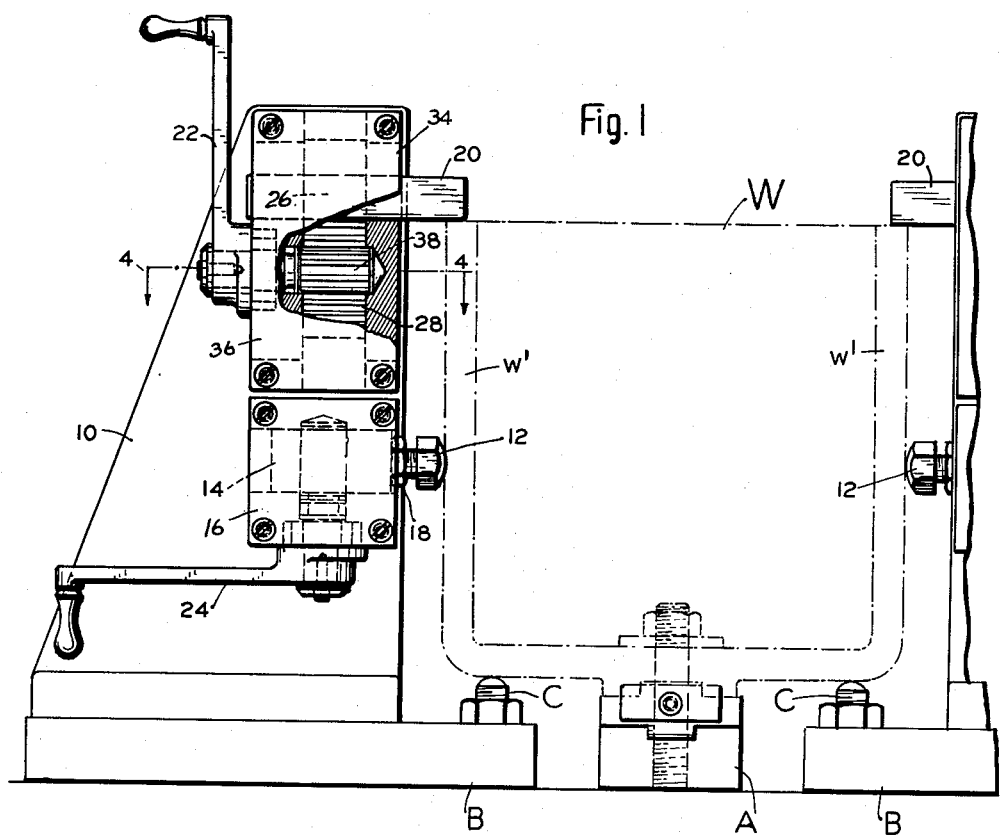
Fig. 1
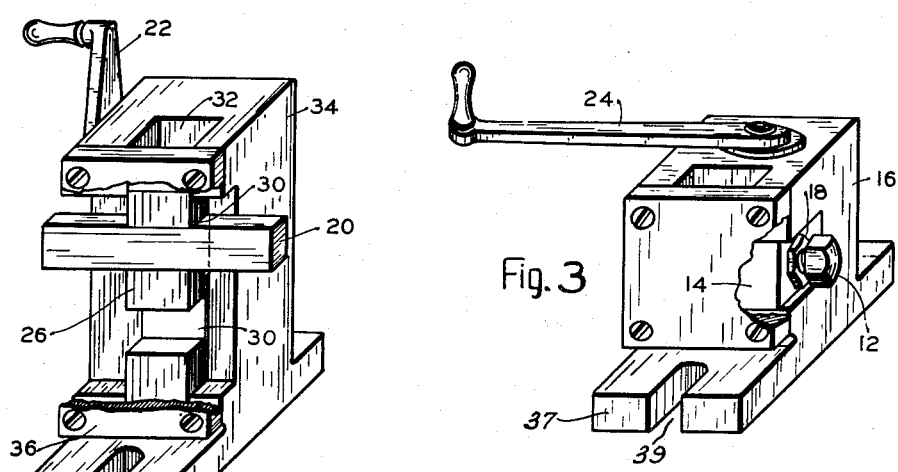
Fig. 2
Fig. 3
INVENTOR
ALBERT J. GIFFORD
BY Charles P. Fay, atty.

Aug. 10, 1954   A. J. GIFFORD   2,685,898
QUICK-ACTING PRECISION CLAMPING DEVICE
Filed July 12, 1950   2 Sheets-Sheet 2

INVENTOR
ALBERT J. GIFFORD
BY Charles R. Fay
atty.

Patented Aug. 10, 1954

2,685,898

UNITED STATES PATENT OFFICE 2,685,898

QUICK-ACTING PRECISION CLAMPING DEVICE

Albert J. Gifford, Shrewsbury, Mass., assignor to Leland-Gifford Company, Worcester, Mass., a corporation of Massachusetts Application July 12, 1950, Serial No. 173,255

4 Claims. (Cl. 144—290)

1

This invention relates to precision clamping devices which are extremely quick and easy to operate and the principal object of the invention resides in the provision of a clamp for use particularly with work pieces, but not limited to this use, such clamp being of a nature to apply a clamping force exactly where desired with a minimum of care and action on the part of the operator; the provision of a precision clamping device including a movable clamping element and means to move the element up to and into contacting relation with the object or work piece, etc., to be clamped, said element being stopped thereby; said means thereupon applying a rigid clamping action at the exact location desired without further actuation; and the provision of a device as above described including a clutch having a handle in combination with a movable clamping element, the handle causing the element to engage the object to be clamped, and the clutch thereupon causing a locking action relative to the element.

A further object of the invention resides in the provision of a clamp of the class described including gear operated or the like means for moving a clamping element to clamping position and means operated by the same means imparting a clamping action thereto when the desired position is reached, said last named means embodying a roller clutch arrangement and including a handle therefor, said handle being operative not only to move the clamping element but also to clamp or lock it in clamped position through the intermediary of the roller clutch, in the same movement thereof.

Another object of the invention resides in the provision of the device as described including a locating means and clamp disposed for travel in a plane at an angle to the travel of the above described clamping element so as to locate and clamp an object in at least two different planes.

Other objects and advantages of the invention will appear hereinafter.

Reference is to be had to the accompanying drawings in which

Fig. 1 is a view in elevation of a device according to the present invention, parts being in section;

Fig. 2 is a perspective view of a clamping element itself, parts being broken away;

Fig. 3 is a perspective view of another locating or clamping element, this view being inverted with relation to Fig. 1;

Figure 4:
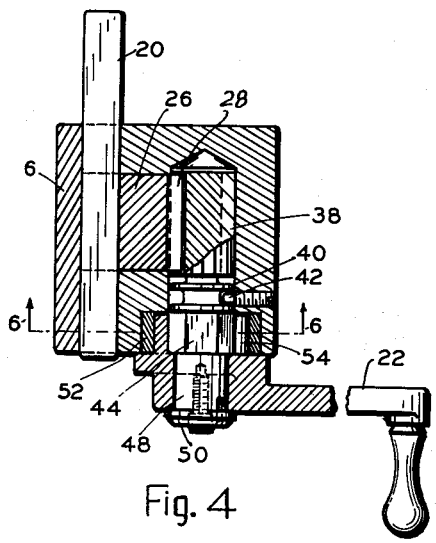
Fig. 4 is a section on line 4—4 of Fig. 1.

This invention provides a new and improved positioning and clamping device which is particularly adapted to fixtures for machine tools, but it has also a universal application which will be clear to those skilled in the art. This invention has been chosen to be illustrated as clamping a piece indicated generally at W in Fig. 1, said piece comprising at least a bottom and sides W, W1. The entire assembly is to be secured to the bed of a machine as shown. It has a special clamping fixture illustrated at A which forms no part of the present invention, the clamping means A being mounted on the bed of the machine. The same is true of a base B, this base being duplicated at each side of the clamping element A. Adjustable pins or fingers C may be used to level the piece W as shown in Fig. 1. The parts A, B and C are all merely illustrative and form no part of the invention.

The invention herein comprises a standard 10 mounted on a base B and essentially comprising two principal parts one of which is shown as an adjustable abutting or clamping member 12 which is screw threaded into a sliding block or the like 14 mounted in a housing 16, there being a lock nut 18 to assure the adjusted position of the head 12. It is to be understood that the standard 10 and all parts of the device associated therewith may be duplicated at the opposite side of the work W as indicated in Fig. 1 and the head 12 moves to and from the wall W1 of the work.

A clamping element 20 is arranged to move at right angles to the head 12, in this case vertically, whereas the head 12 moves horizontally; and it will be clear that the element 20 is adapted to move down to clamp the work W in a vertical relation. A rotating handle 22 is used to move element 20 and a similar handle 24 is used to move the head 12.

Mechanism is provided separately for the elements 12 and 20 to move the same up to engaging position with the work W by means of the respective handles and the work itself stops the motion of the elements 12 and 20, whereupon continued motion in the same direction of the respective handles is effective to clamp or lock the elements firmly so that no upward movement directly on element 20 can unclamp it, and no direct lateral force on head 12 may unclamp the same except by moving the handles oppositely to the direction of motion required for the clamping action.

It will be seen that this provides an extremely fast and accurate clamping device since no special action is required on the part of the operator to perform the clamping operation at all. It is only necessary to bring the clamping elements up to the work piece and continue the motion of the handles in the same direction for this purpose, whereupon the elements are solidly clamped and cannot be unclamped except by movement of the handles reversely.

Referring more particularly now to the clamping element 20, this comprises a bar best seen in Fig. 2 and which is mounted preferably with a slip fit in a reciprocatory member 26 having rack teeth 28 thereon at one side thereof, and having a plurality of slots 30 on the opposite side thereof, see Fig. 2. The clamping bar 20 is insertable in either of the slots 30 so as to multiply the range of the member and as many slots 30 as desired may, of course, be used.

The clamping bar 20 extends out of a housing 34 through an elongated slot parallel to and communicating with a guideway 32 in which the member 26 is located for reciprocating movement, and this guideway is closed by a plate 36. Housings 16 and 24 may be provided with bases 37 having slots 39, if desired, for securing the same to a base or support.

Figures 5, 6:
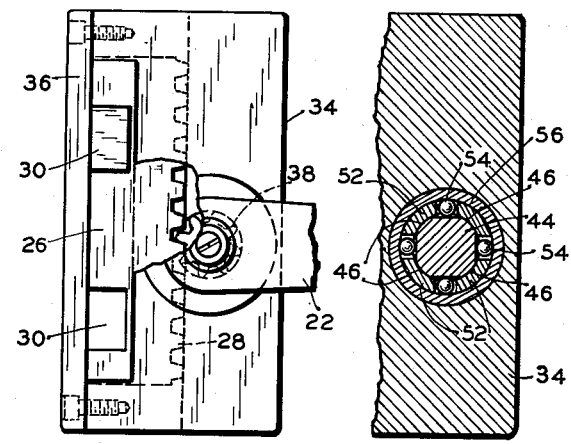
Fig. 5 is a view in elevation of the rack and pinion means for actuating the clamping element of Fig. 4.
Fig. 6 is a section on line 6—6 of Fig. 4.
Figure 7:
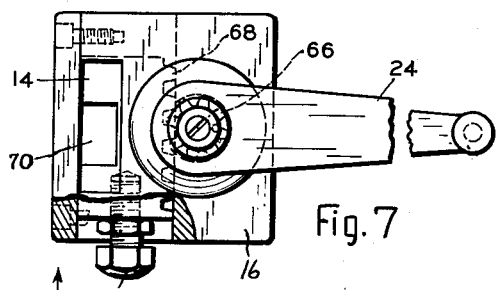
Fig. 7 is a top plan view of the clamping device of Fig. 3, parts being broken away and in section.
Figure 10:
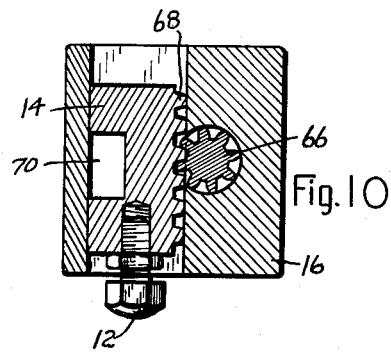
Fig. 10 is a section on line 10—10 of Fig. 8.
Figure 8:
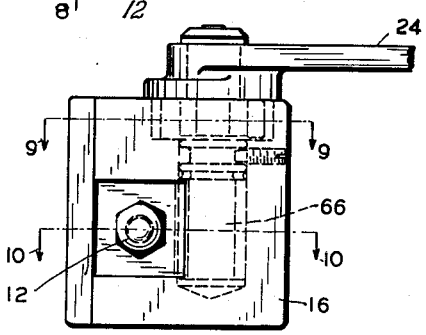
Fig. 8 is a view in elevation of the device of Fig. 7 looking in the direction of arrow 8.
Figure 9:
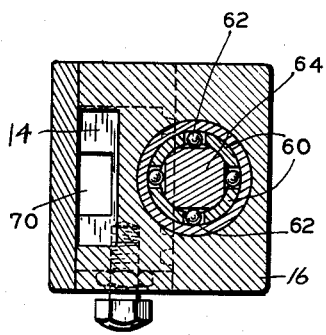
Fig. 9 is a section on line 9—9 of Fig. 8.

The teeth 28 are engaged with the teeth of a pinion 38 mounted to rotate within the housing 34 on a stud 40 held against extraction by a pin 42 or the like. The stud 40 extends oppositely from the pinion 38 forming a square sided element 44 which as shown in Fig. 6 has rounded off corners as at 46. This block terminates in a cylindrical head 48 having a cap 50 secured thereto, see Fig. 4, the cylindrical head 48 serving as a rotary support for handle 22.

Handle 22 is provided with a series of fingers 52 which are arc shaped, see Fig. 6 and are disposed about the stud part 44 being located on the round portions 46. The fingers 52 are spaced at the flats of the square sided stud 44 and in these spaces there are provided rollers 54. A cylinder 56 contains the fingers and rollers, see Fig. 6.

The member 26 is, therefore, a rack which is moved up and down by the pinion 38 under control of handle 22 and the construction of the roller clutch, best shown in Fig. 6, is such that the handle 22 will rotate pinion 38 and thus move the rack unless and until the rack is stopped by some external means which in this case is the engagement of clamping element 20 with the work W. Clearly when the handle is actuated to move the rack down so that element 20 engages the work, the rack may move no farther; and a continued slight rotation of handle 22 results in the camming of rollers 54 by fingers 52 into the narrower spaces occasioned by the curvature of the cylinder at 56 in housing 34. This action firmly and precisely clamps the member to the work and locks the handle so that no amount of pressure in the opposite direction on member 20 will serve to unclamp it except by moving the handle 22 in the direction opposite to the direction required for clamping. Therefore, it is clear that the clamp is operated quickly, precisely and rigidly.

The positioning and clamping head 12 is actuated in essentially the same way, handle 24 being provided with lateral fingers 60 between which are positioned rollers 62 on the flats of the square stud 64, the latter forming an extension of a pinion gear 66 in mesh with the teeth 68 on block 14 which carries the head 12 as previously described. However, block 14 may be provided with a slot 70 in which a member such as element 20 may be positioned to extend out of the housing 16 in a direction opposite to that of the handle to be moved laterally by said block for clamping reasons. In this case, however, the head 12 would not be used and the housing 16 would not be mounted in the manner shown in Fig. 1.

It will be seen that this invention provides an extremely easily operated and effective clamp which may be used both for positioning and clamping, and it is to be understood that as many as these clamps as desired or convenient may be utilized with each piece to be clamped. That is, suppose the work W to be considerably elongated, further pairs of similar clamps may be mounted on the bed of the machine and operated as above described along the length of the work.

Having thus described my invention and the advantages thereof, I do not wish to be limited to the details herein disclosed otherwise than as set forth in the claims, but what I claim is:

1. A clamp of the class described comprising a housing, an enclosed guideway therein, a rack rectilinearly moveable in the guideway, a slot in the housing along the guideway and shorter than the guideway, a pinion for the rack, a handle to rotate the pinion, and a roller clutch between the handle and pinion, a clamping bar on the rack extending out of the housing through the slot, and means providing for adjustment of the clamping bar on the rack, said clamping bar adjusting means comprising a series of slots in the rack in any of which slots the clamping bar is adapted to be located, the slot in the housing being at right angles to the slots in the rack and being of a length to include the rack slots.

2. A clamp and positioning device for a workpiece comprising a base, a standard rising from the base, a pair of racks on the standard, one rack being longitudinally movable parallel to the base and the second rack being movable at right angles thereto, a clamping element on each rack for corresponding movement therewith, a pinion to move each rack, a clamp locking roller clutch between each pinion and the means to rotate the same and means to abut a workpiece aligned with the clamping element on the one rack, whereby the workpiece located against said abutting means by movement of the clamping element on the one rack is clamped in a direction parallel to and at right angles to the base by appropriate actuation of each pinion rotating means.

3. A device of the class described comprising a base, a standard thereon, a housing on the standard, a guideway in the housing extending at right angles to the base, a cover for the guideway, a rack in the guideway, a slot in the housing at each side of the guideway shorter than the guideway, and communicating therewith, a cross slot in the rack, a clamping element in the cross slot extending outwardly from the housing through either or both slots in the housing selectively, means to move the rack, said last-named means including a clutch of the roller friction type.

4. A device of the class described comprising a base, a standard thereon, a housing on the standard, a guideway in the housing, a cover for the guideway, a rack in the guideway, a slot in the housing shorter than the guideway, and communicating therewith, a cross slot in the rack, a clamping element in the cross slot extending outwardly from the housing through the slot in the housing, means to move the rack, said last-named means including a clutch of the roller friction type.

References Cited in the file of this patent

UNITED STATES PATENTS

| Number | Name | Date |
| --- | --- | --- |
| 112,801 | Good | Mar. 21, 1871 |
| 142,697 | Holmes | Sept. 9, 1873 |
| 172,032 | King | Jan. 11, 1876 |
| 438,850 | Lockwood | Oct. 21, 1890 |
| 1,028,584 | McKnight | June 4, 1912 |
| 1,210,093 | Middleton | Dec. 26, 1916 |
| 1,402,621 | Knittel et al. | Jan. 3, 1922 |
| 1,626,197 | Hutton | Apr. 26, 1927 |
| 1,841,196 | Mass | Jan. 12, 1932 |
| 1,966,064 | Gloor | July 10, 1934 |
| 2,021,336 | Swartz | Nov. 19, 1935 |
| 2,231,646 | Wahlstrom | Feb. 11, 1941 |
| 2,380,661 | Marsulius | July 31, 1945 |
| 2,515,533 | Suter | July 18, 1950 |